J. J. SOULLIARD.
TOY.
APPLICATION FILED SEPT. 19, 1919.
1,344,064.
Patented June 22, 1920.
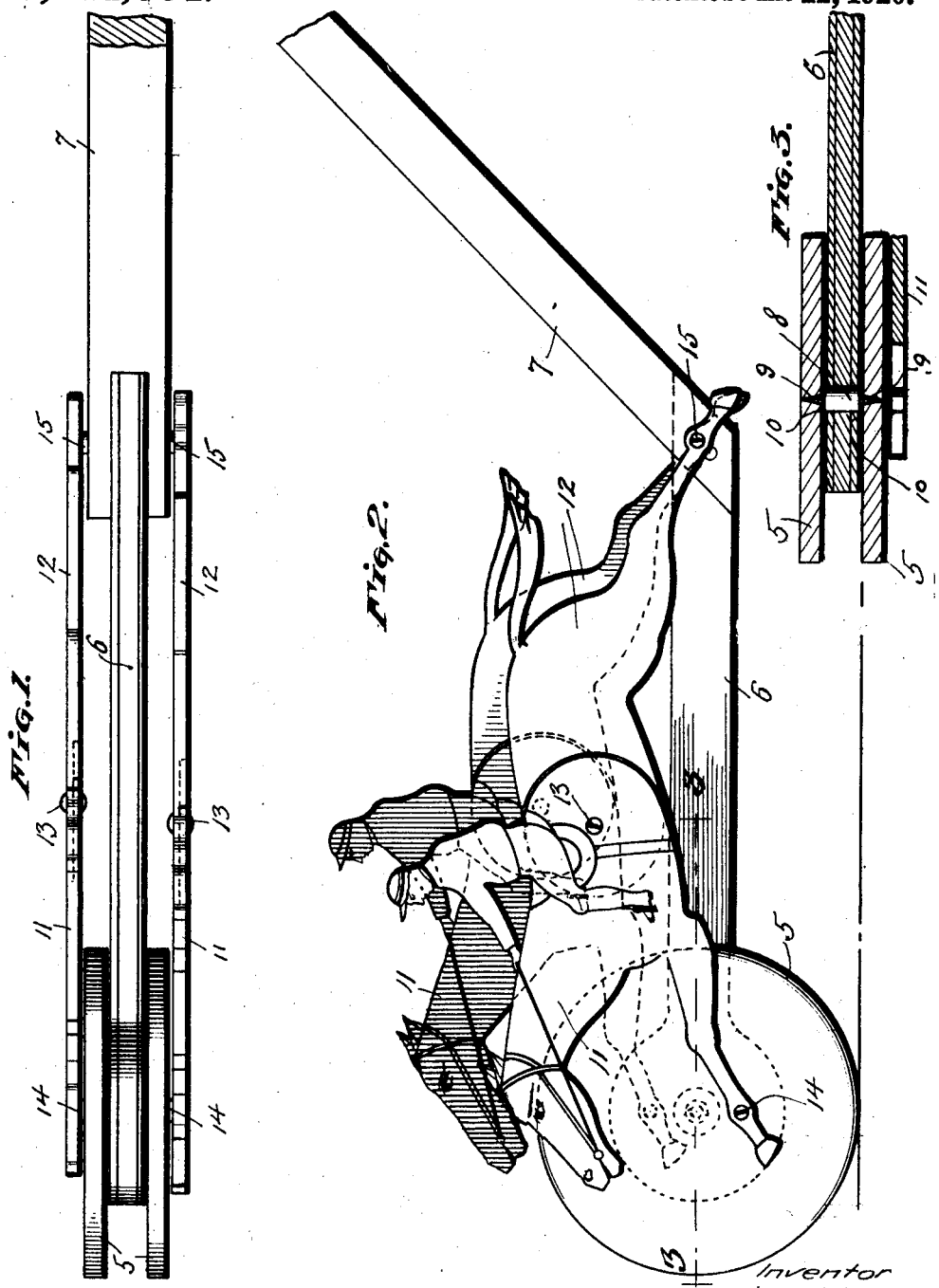

UNITED STATES PATENT OFFICE.

JAMES J. SOULLIARD, OF CHICAGO, ILLINOIS.

TOY.

1,344,064. Specification of Letters Patent. Patented June 22, 1920.

Application filed September 19, 1919. Serial No. 324,901.

*To all whom it may concern:*

Be it known that I, JAMES J. SOULLIARD, a citizen of the United States, residing at Chicago, in the county of Cook and State of Illinois, have invented new and useful Improvements in Toys, of which the following is a specification.

This invention relates to wheeled toys containing figures which are put in motion by the wheels of the device when the same are run along the ground, there being a driving connection between said wheels and the figures.

The invention has for its object to provide a novel and improved wheeled figure toy of the kind stated, and to this end it consists in a combination and arrangement of parts to be hereinafter described and claimed.

In order that the invention may be better understood, reference is had to the accompanying drawing forming a part of this specification, and in said drawing, Figure 1 is a plan view of the toy;

Fig. 2 is a side elevation thereof, and

Fig. 3 is a sectional detail on the line 3—3 of Fig. 2.

Referring specifically to the drawing, 5 denotes a pair of ground wheels which are carried at the forward end of a base bar 6 to the rear end of which latter is attached a stick 7. The wheels are designed to be run on the ground by grasping the stick 7 and pushing thereon.

As shown in Fig. 3, the axle for the wheels 5 is in the form of a round pin 8 having reduced, pointed and screw threaded ends 9. The pin 8 passes loosely through the bar 6 so as to be free to turn, and the ends 9 are screwed into the wheels, with washers 10 interposed between the wheels and the bar. The wheels are, of course, fast on the axle. The washers 10 seat the wheels straight and firmly, and also space the wheels from the bar 6 so as not to rub thereagainst when they are running.

Alongside each wheel 5 and the base bar 6 is mounted a figure representing a galloping horse and its rider. Each figure is composed of pivotally connected front and rear sections 11 and 12, respectively, the rider being integral with the front section. The two sections are lap-jointed and connected by a pivot screw or bolt 13. The front portion of one figure is connected to one of the wheels, and to the other wheel is connected the front portion of the other figure, the connections being made at the front legs of the figures by pivot screws or bolts 14. The rear portion of each figure is connected to the lower end of the stick 7 where it is connected to the bar 6, the connection being made at the rear legs by pivot screws or bolts 15.

The connections between the sections 11 and 12 of the figures and the wheels 5 and the stick 7 are on opposite sides of the pivotal connection 13 between the sections, and hence when the wheels are rolled along the ground the figures are given a motion closely simulating the motion of two horses running. The two figures are alongside each other and the connections 14 are diametrically opposite with respect to the axle 8, in view of which it will be evident that when the two figures are in motion they move relative to each other, giving the appearance of two horses running a race.

I claim:

1. A toy comprising a pair of ground wheels, a support for the wheels on opposite sides of which the wheels are located, a figure on each side of the support and alongside the respective wheels, each figure having pivotally connected front and rear sections, connections between the wheels and the front sections of the respective figures, and connections between the support and the rear sections of the respective figures.

2. A toy comprising a pair of ground wheels, a support for the wheels on opposite sides of which the wheels are located, a figure on each side of the support and alongside the respective wheels, each figure having pivotally connected front and rear sections, connections between the wheels and the front sections of the respective figures, and connections between the support and the rear sections of the respective figures, the connections between the wheels and the front sections being diametrically opposite with respect to the axis of the wheels.

In testimony whereof I affix my signature.

JAMES J. SOULLIARD.